Apr. 24, 1923.
S. H. CAMPBELL
1,453,002
COUPLING RELEASE RIGGING
Filed Aug. 12, 1922
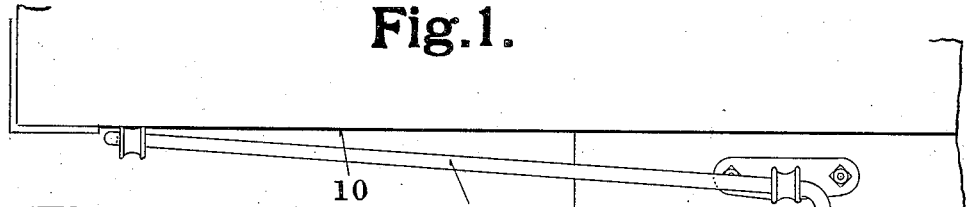
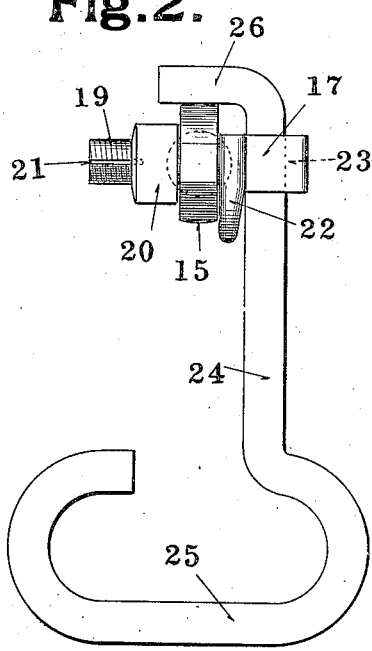
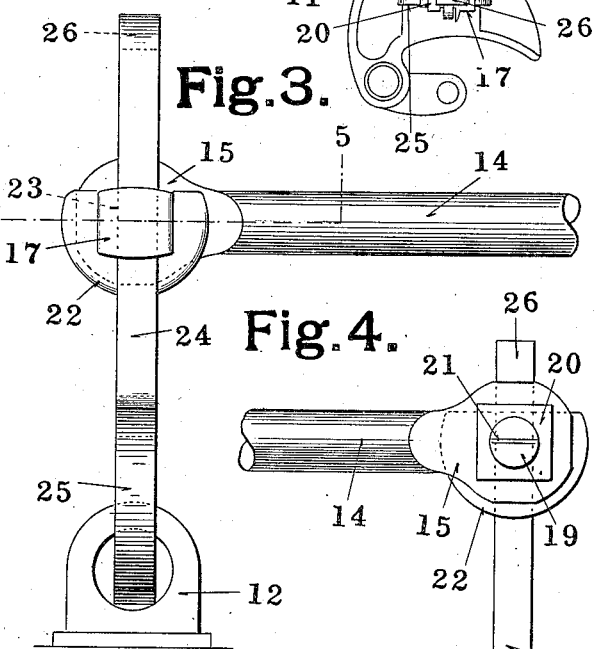
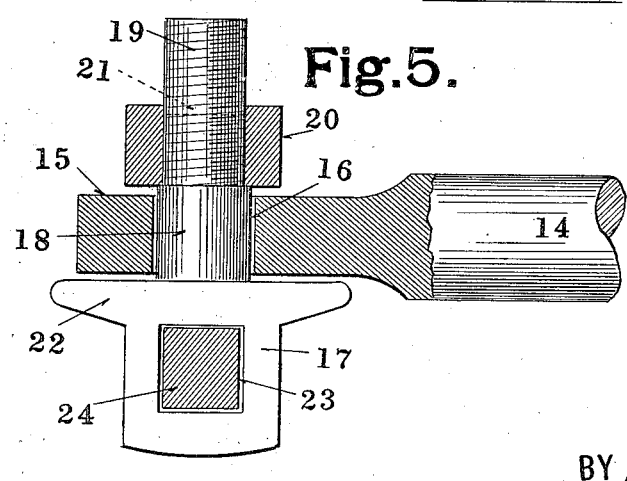
INVENTOR
S. H. CAMPBELL
BY *E. E. Huffman*
ATTORNEY Patented Apr. 24, 1923.                                                      1,453,002

UNITED STATES PATENT OFFICE.

STERLING H. CAMPBELL, OF ST. LOUIS, MISSOURI.

COUPLING-RELEASE RIGGING.

Application filed August 12, 1922. Serial No. 581,400.

*To all whom it may concern:*

Be it known that I, STERLING H. CAMPBELL, a citizen of the United States of America, residing at the city of St. Louis, State of Missouri, United States of America, have invented a certain new and useful Coupling-Release Rigging, of which the following is such a full, clear, and exact description as will enable any one skilled in the art to which it appertains to make and use the same, reference being had to the accompanying drawings, forming part of this specification.

My invention relates to a coupler release rigging and particularly to that type of rigging in which a single link connects the operating arm and locking pin, said link having vertical movement relative to the arm.

One object of my invention is to produce a device of this class in which the points of contact of the link with the arm and pin will be maintained as nearly as possible in the same vertical plane under varying operating conditions. Another object of my invention is to apply my device to an operating arm provided with a horizontal eye so (to apply my device to an operating arm provided with a horizontal eye so) that the strain in lifting the pin will not be borne by the attachment through which the link is connected to the arm.

In the accompanying drawings which illustrate one form of device made in accordance with my invention Figure 1 is a plan view of the end of a railway car to which my device is applied, Figure 2 is a front view of the operating arm together with my link and connecting member, Figure 3 is a side view of the parts shown in Figure 2, Figure 4 is a view similar to Figure 3, but looking from the opposite side, and Figure 5 is an enlarged section taken on the line 5—5 of Figure 3.

10 indicates a railway car to which my device is applied. The car 10 is provided with the usual coupler head 11 controlled by a locking pin 12. 13 is a rock shaft forming the operating rod and having a forwardly projecting arm 14 working in a vertical plane. The arm 14 terminates in a flattened portion 15 in which is formed the horizontal eye 16. All the above mentioned parts are old and well known in the art and may be of any suitable construction.

17 is the body of a connecting member carrying a stud 18 adapted to pass through the eye 16 in the arm 14. The stud 18 is provided with a threaded end 19 preferably reduced in diameter, as shown in Figure 5, so as to form a shoulder against which the fastening nut 20 may bear to prevent binding of the parts. Suitable locking means should be provided for the nut 20. In the drawings, I have shown this as accomplished by forming a slit 21 in the end of the threaded stud 19 so that the end of the stud may be spread by the insertion of a suitable tool in this slit. A substantially semi-circular plate 22 is preferably formed integral with the connecting member 17 to provide increased bearing surface between this member and the flattened end 15 of the arm 14. 23 is a rectangular opening or eye formed in the member 17 at right angles to the eye 16 and adapted to form a guide way for the body of the link.

24 is the body of the link which is rectangular in cross section and slides in the eye 23 as a guide way. The lower end of the link 24 is provided with an elongated open hook 25 engaging with the locking pin 12 of the coupler head, as shown in Figure 3. 26 is a bent over portion of the upper end of the link 24 adapted to contact with the upper edge of the flattened portion 15 of the arm 14 so as to take all strain off the connecting member 17 when the pin is raised.

The operation of my device is as follows: The longitudinal sliding movement of the link 24 in the member 17 allows the arm 14 to assume its normal position while the pin is in raised position. As the stud 18 is free to turn in the eye 16 the link 24 has swinging movement in a longitudinal vertical plane to compensate for the longitudinal movement of the draw head. Movement of the link in a lateral plane is, however, prevented, the lateral movement of the coupler being accommodated by the elongated form of the hook 25.

Having fully described my invention, what I claim as new and desire to secure by Letters Patent of the United States is:

1. The combination with a coupler head provided with a locking pin, of an operating arm, a link having an open hook at its lower end engaging with said pin, said link having longitudinal movement relative to the arm and also having swinging movement in a longitudinal vertical plane, and means for preventing movement of said link in a transverse plane, said link being adapted to engage the upper surface of said arm when the arm is actuated to lift the pin.

2. The combination with a coupler head provided with a locking pin, of an operating rod, a link having an open hook at its lower end engaging with the pin, said link having longitudinal movement relative to the rod and also having swinging movement in a longitudinal vertical plane, means for preventing movement of said link in a transverse plane, and means for preventing rotation of said link on its vertical axis, said link being adapted to engage the upper surface of the arm when the arm is actuated to lift the pin.

3. The combination with a coupler lock pin, of a pin lifting arm, a member attached to said arm and provided with a vertical eye, and a link connected to the lock pin and passing through the eye of said member, said link having an angular extension at its upper end to engage with the upper surface of the arm.

4. The combination with a coupler lock pin, of a pin lifting arm, a member attached to said arm and provided with a vertical eye, and a link provided at its lower end with an open hook engaging with the eye of the lock pin, said link passing through the eye of said member, said link having an angular extension at its upper end lying in the plane of the hook to engage with the upper surface of the arm.

5. The combination with a coupler lock pin, of a pin lifting arm, a member attached to said arm and provided with a vertical eye, and a link provided at its lower end with an open elongated hook engaging with the eye of the lock pin, said link passing through the eye in said member, the fit between said member and link preventing transverse movement of the latter, said link having an angular extension at its upper end to engage with the upper surface of the arm.

6. The combination with a coupler head provided with a locking pin, of an operating rock shaft, a forwardly projecting arm provided with a horizontal eye and carried by said rock shaft, a member secured to said arm and provided with an eye at an angle to said first named eye, and a link connected to the pin and movable longitudinally in the eye of said member, said link being adapted to engage the upper surface of the arm when the arm is actuated to lift the pin.

7. The combination with a coupler head provided with a locking pin, of an operating rock shaft, a forwardly projecting arm provided with a horizontal eye and carried by said rock shaft, a member secured to said arm provided with an eye at an angle to said first named eye, and a link provided at its lower end with an open hook engaging with the locking pin, said link being movable longitudinally in the eye in said member, said link being adapted to engage the upper surface of said arm when the arm is actuated to lift the pin.

8. The combination with a coupler head provided with a locking pin, of an operating rock shaft, a forwardly projecting arm provided with a horizontal eye and carried by said rock shaft, a member secured to said arm provided with an eye at right angles to said first named eye, and a link lying in a single plane provided at its lower end with an open hook engaging with the eye and movable longitudinally in the eye in said member, said link being adapted to engage the upper surface of said arm when said arm is actuated to lift the pin, and means for preventng rotation of the link on its vertical axis.

9. The combination with a coupler head provided with a locking pin, of an operating rock shaft, a forwardly projecting arm provided with a horizontal eye and carried by the rock shaft, a member passing through said eye and projecting laterally from the arm, said member being provided with an eye at right angles to said first named eye, and a link connected with a pin and movable longitudinally in the eye of said member, said link being adapted to engage the upper surface of said arm when said arm is actuated to lift the pin.

10. The combination with a coupler head provided with a locking pin, of an operating shaft, a forwardly projecting arm provided with a horizontal eye and carried by said rock shaft, a member passing through said eye and projecting laterally from the arm, said member being provided with an eye at right angles to said first named eye, and a link passing through the eye in said member, said link being provided at its lower end with an elongated open hook engaging with the pin and at its upper end with a turned over portion lying in the plane of the hook and adapted to engage the upper surface of the arm when said arm is actuated to lift the pin.

11. The combination with a coupler lock pin, of a pin lifting arm, a member attached to said arm and provided with a vertical eye, and a link connected to the lock pin and passing through the eye of the member, said link being of uniform polygonal cross section throughout its length and having its upper end turned over to form an extension engaging with the upper surface of the arm when the pin is lifted.

In testimony whereof, I have hereunto set my hand and affixed my seal.

STERLING H. CAMPBELL. [L. S.]